United States Patent
Chou

(10) Patent No.: US 8,121,359 B2
(45) Date of Patent: Feb. 21, 2012

(54) FINGERPRINT IDENTIFICATION SYSTEM AND METHOD OF AN ELECTRONIC DEVICE

(75) Inventor: Meng-Chieh Chou, Tu-Cheng (TW)

(73) Assignee: Chi Mei Communication Systems, Inc., Tu Cheng, New Taipei (TW)

( * ) Notice: Subject to any disclaimer, the term of this patent is extended or adjusted under 35 U.S.C. 154(b) by 711 days.

(21) Appl. No.: 12/344,572

(22) Filed: Dec. 28, 2008

(65) Prior Publication Data

US 2010/0119125 A1     May 13, 2010

(30) Foreign Application Priority Data

Nov. 12, 2008   (CN) .......................... 2008 1 0305487

(51) Int. Cl.
 *G06K 9/00*   (2006.01)
(52) U.S. Cl. ......... 382/124; 382/115; 382/125; 382/126
(58) Field of Classification Search .................. 382/115, 382/124, 125, 126, 127; 118/31.5; 283/68, 283/69, 70, 78; 340/5.53, 5.83; 396/15; 713/186

See application file for complete search history.

(56) References Cited

U.S. PATENT DOCUMENTS

| | | | | |
|---|---|---|---|---|
| 6,052,475 A | * | 4/2000 | Upton | 382/125 |
| 6,259,804 B1 | * | 7/2001 | Setlak et al. | 382/124 |
| 6,990,219 B2 | * | 1/2006 | Morimura et al. | 382/125 |
| 2009/0326840 A1 | * | 12/2009 | Gebara et al. | 702/57 |

OTHER PUBLICATIONS

T.W. Lim et al. "Capacitive fingerprint sensor chip for automatic matching". I.E.E.E. Conference, vol. 2, pp. 442-446, Year 2000.*

* cited by examiner

*Primary Examiner* — Brian Le
(74) *Attorney, Agent, or Firm* — Altis Law Group, Inc.

(57) ABSTRACT

An electronic device having a fingerprint identification system obtains a voltage graph of a fingerprint from pressed signals of a user logging in via a touch panel of the electronic device. The system detects fingerprint characteristic points in the voltage graph of the fingerprint of the user logging in, and computes fingerprint characteristic values according to the detected fingerprint characteristic points. The system further determines if the computed fingerprint characteristic values match original fingerprint characteristic values an authorized user, and validates the identification of the user logging in.

11 Claims, 5 Drawing Sheets

FINGERPRINT IDENTIFICATION SYSTEM AND METHOD OF AN ELECTRONIC DEVICE

BACKGROUND

1. Technical Field

The present disclosure generally relates to systems and methods for controlling access to an electronic device, and particularly to a system and method for controlling access to an electronic device by validating fingerprints.

2. Description of Related Art

Electronic devices can store and analyze various kinds of private information (i.e., personal data, phone lists, message records, trading information and call histories, etc). One method for ensuring information security of an electronic device is to require and to analyze fingerprint identification of a user. However, such analysis may be inconvenient and time consuming.

DETAILED DESCRIPTION OF CERTAIN INVENTIVE EMBODIMENTS

Figure 1:
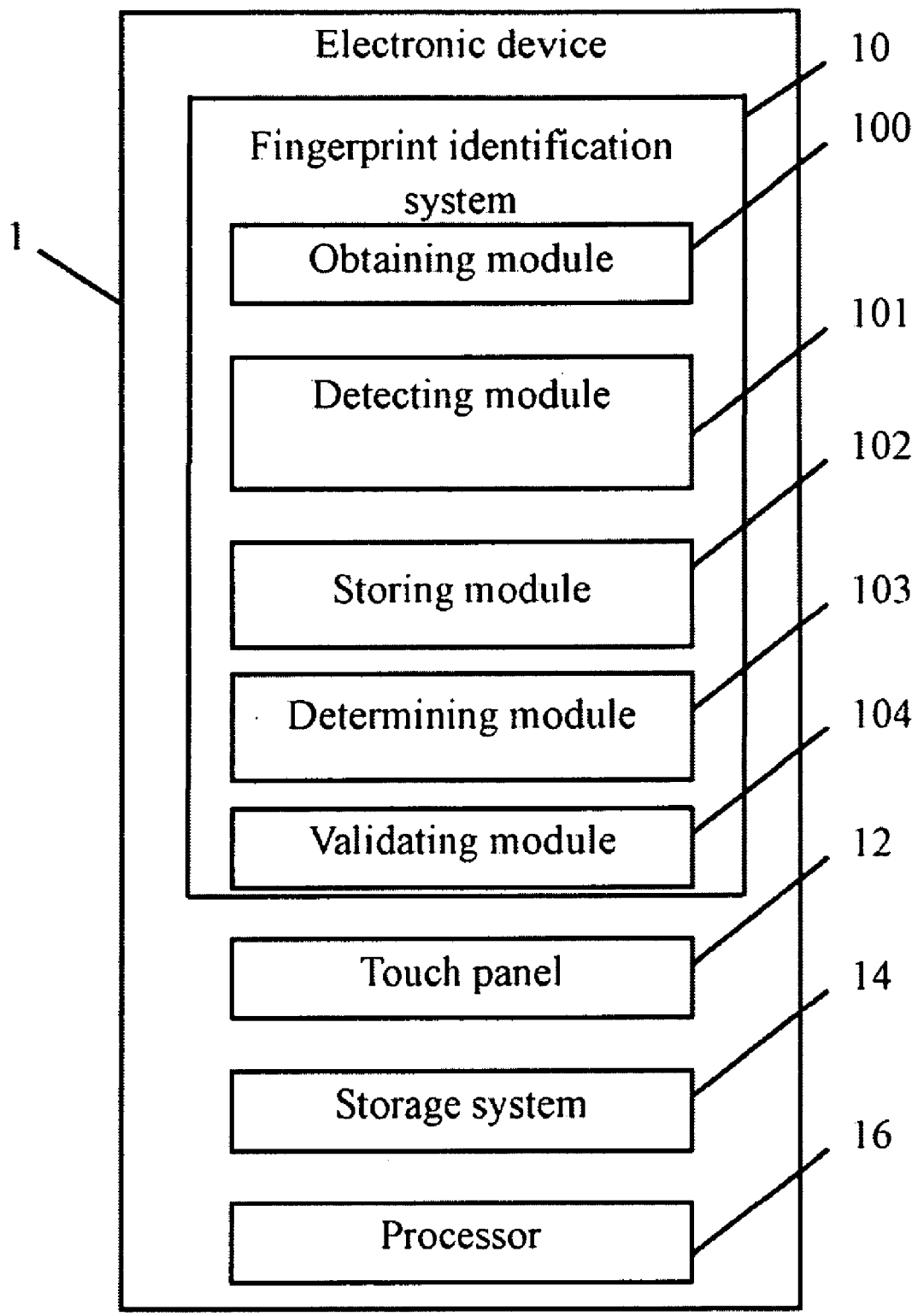
FIG. 1 is a block diagram of a fingerprint identification system of an electronic device in accordance with one exemplary embodiment.

FIG. 1 is a block diagram of an electronic device 1 including a fingerprint identification system 10 in accordance with one exemplary embodiment. The fingerprint identification system 10 is configured for identifying users access to the electronic device 1. The electronic device 1 includes a touch panel 12, a storage system 14, and a processor 16 for executing one or more operations of the fingerprint identification system 10.

The electronic device 1 may be a mobile phone, a personal digital assistant (PDA), a handheld game player, a digital camera, an entrance guard system, or other portable electronic devices.

Figure 3:
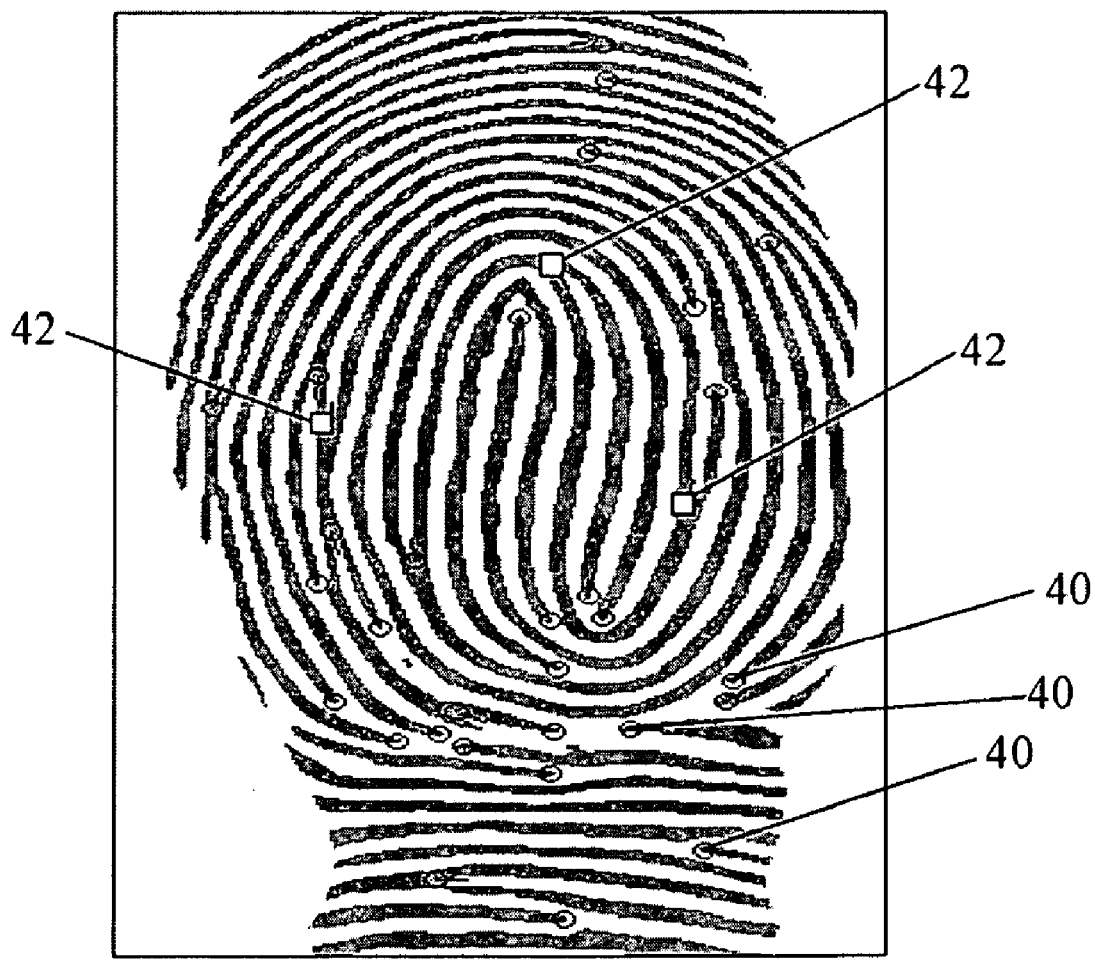
FIG. 3 is a schematic diagram of an exemplary voltage graph of a fingerprint including main characteristic points and sub characteristic points.

The touch panel 12 is configured for generating voltage graphs after a user presses the touch panel 12 using one or more fingers of the user. When the electronic device 1 is powered on, a voltage is applied to the touch panel 12. The voltage may be 5V in one embodiment. The voltage of the touch panel 12 changes after the users presses the touch panel 12 using the one or more fingers of the user. The changed voltage is outputted to an analog/digital (A/D) converter (not shown) to obtain a digital voltage signal of a fingerprint of the user. Exemplary voltage graphs are shown in FIG. 3 and are described in greater detail below.

The storage system 14 may be an internal memory card or an external memory card. The external memory card may include a smart media card (SMC), a secure digital card (SDC), a compact flash card (CFC), a multi media card (MMC), a memory stick (MS), an extreme digital card (XDC), and a trans flash card (TFC). The storage system 14 is used for storing original fingerprint characteristic values of authorized users of the electronic device 1. The fingerprint characteristic values may be analogous to a username or a password or a login ID (identification) of typical access management systems. In the illustrated embodiment, original fingerprint characteristic values represent an initial setting of the authorized users. The original fingerprint characteristic values may include a characteristic point count, characteristic point coordinates, and a linked shape of the characteristic points.

The fingerprint identification system 10 includes a obtaining module 100, a detecting module 101, a storing module 102, a determining module 103, and a validating module 104. The modules 100, 101, 102, 103 may be used to execute one or more operations for the electronic device 1 as will be explained in greater detail below.

The obtaining module 100 is connected to the touch panel 12, and configured for obtaining original voltage graphs of a fingerprint of a user in response to receiving a pressed signal from the touch panel 12 when the user presses the touch panel 12 using one or more fingers of the user.

The detecting module 101 is configured for detecting original fingerprint characteristic points of each user in the original voltage graph of each fingerprint from the storage system 14, and computing the original fingerprint characteristic values of each user according to the original fingerprint characteristic points. FIG. 3 shows an example of exemplary characteristic points of original fingerprint characteristic points or fingerprint characteristic points of a currently input fingerprint, such as from a user logging into the electronic device 1. The exemplary characteristic points may be used to compare with the original fingerprints in the storage system 14 to verify the authenticity of the user. In FIG. 3, the voltage graph of the fingerprint is highlighted with a plurality of circular parts 40 and rectangular parts 42. The circular parts 40 and the rectangular parts 42 indicate the characteristic points detected in the voltage graph. The circular parts 40 represent sub-characteristic points, which include whorls and a triradius of the fingerprint. The rectangular parts 42 represent main characteristic points, which include broken fingerprint ridges and bifurcating fingerprint ridges.

The storing module 102 is configured for storing the original fingerprint characteristic points and the original fingerprint characteristic values in the storage system 14.

Figure 4:
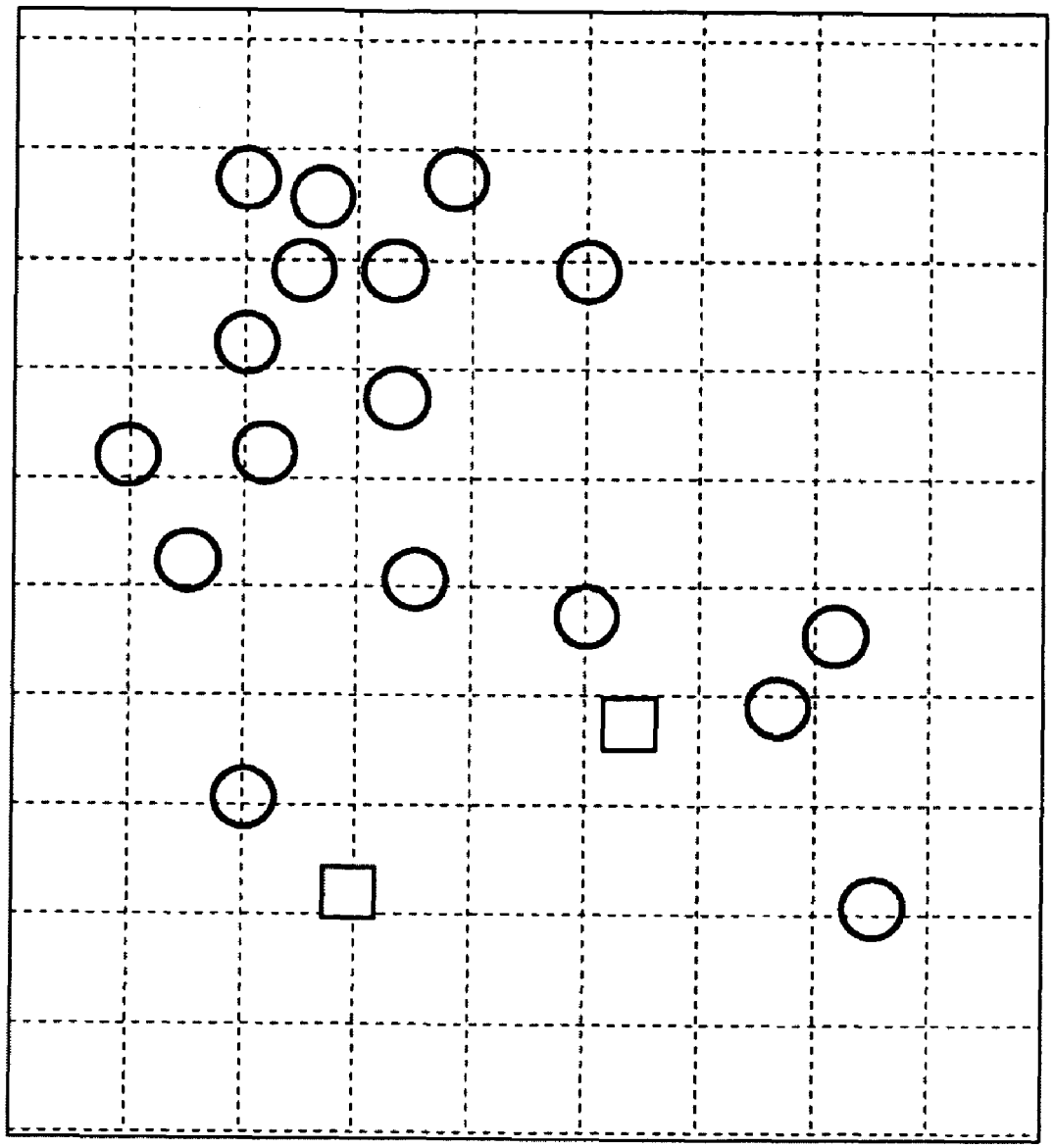
FIG. 4 is a graphical representation of exemplary fingerprint characteristic points in accordance with one exemplary embodiment.
Figure 5:
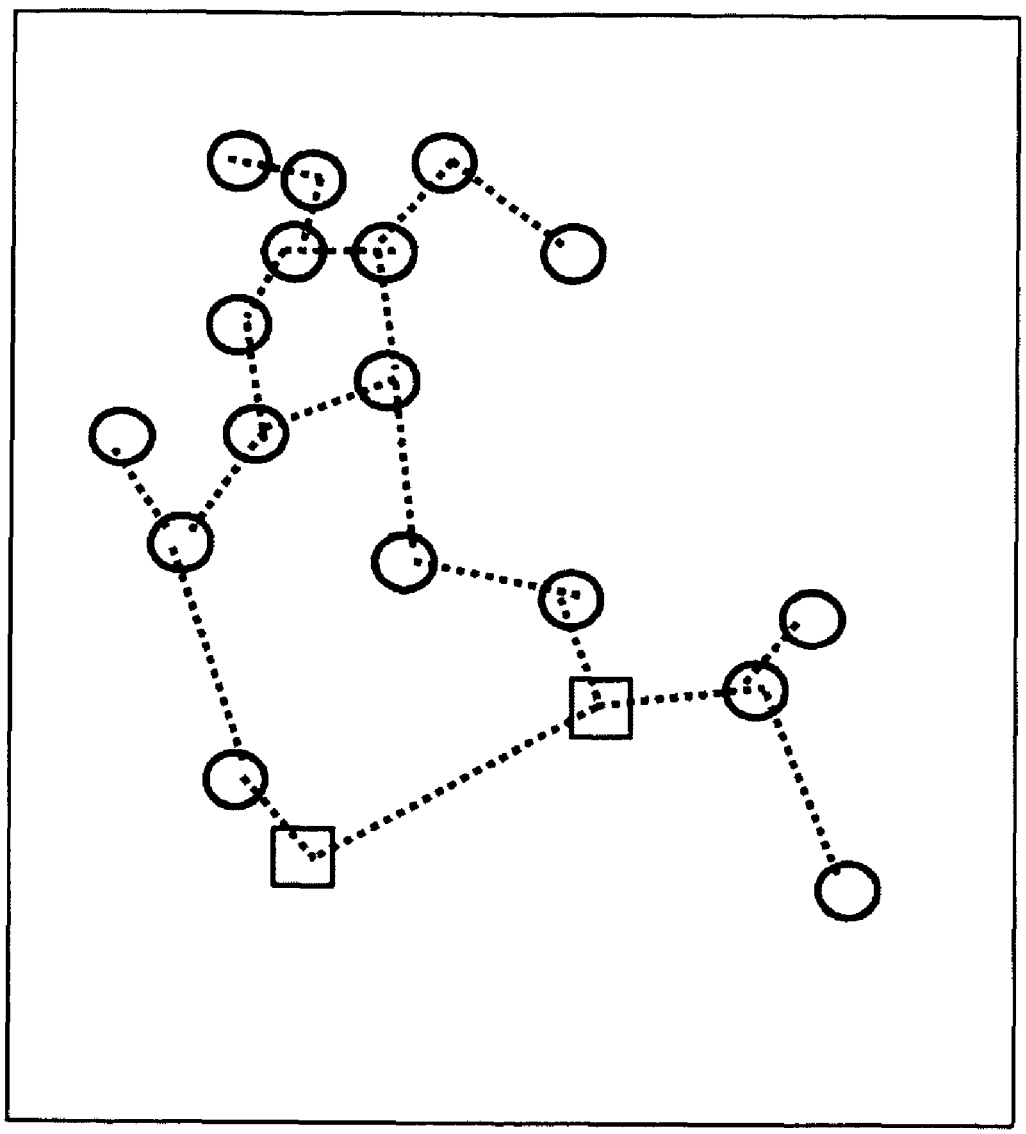
FIG. 5 is a graphical representation of establishing a coordinate system oriented on the characteristic points in accordance with one exemplary embodiment.

FIG. 4 shows a graphical representation of the characteristic points of the fingerprint plotted on a coordinate system in accordance with one exemplary embodiment. The coordinates of the characteristic points may be defined according to the coordinate system of FIG. 4. In the illustrated embodiment of FIG. 4, a count of the rectangular parts is 2, which indicates that the fingerprint has 2 main characteristic points. The count of the circular parts is 17, which indicates that the fingerprint has 17 sub-characteristic points. FIG. 5 shows a graphical representation of a linked shape of the characteristic points of a fingerprint in accordance with one exemplary embodiment. The process of linking the characteristic points to form the linked shape involves computing relative positions between adjacent characteristic points and connecting centers of the adjacent characteristic points according to the computed relative positions.

The obtaining module 100 is further configured for obtaining a voltage graph of a fingerprint of a user logging into the electronic device 1 in response to receiving the pressed signal after a user logging in presses the touch panel 12.

The detecting module 101 is further configured for detecting fingerprint characteristic points in the voltage graph of the fingerprint of the user logging in, and computing fingerprint characteristic values according to the detected fingerprint characteristic points. The fingerprint characteristic values also include the characteristic point count, the characteristic point coordinates, and the linked shape of the characteristic points. The process of detecting fingerprint characteristic points and computing fingerprint characteristic values is the same as the process of detecting the original fingerprint characteristic points and computing the original fingerprint characteristic values.

The determining module 103 is further configured for determining if the computed fingerprint characteristic values match the original fingerprint characteristic values an authorized user in the storage system 14. For example, if a count of the main characteristic points in the fingerprint characteristic points is equal to a count of the main characteristic points of one of the original fingerprints of an authorized user, and a count of the sub-characteristic points in the fingerprint characteristic points is more than 60 percent of a count of the sub-characteristic points of the one of the original fingerprints of the authorized user, then the fingerprint characteristic values are determined to match the characteristic values of one of the fingerprints of the authorized user.

The validating module 104 is configured for validating the identification of the user logging in if the computed fingerprint characteristic values match characteristic values of the authorized user in the storage system 14, and configured for denying access to the electronic device 1 if the computed fingerprint characteristic values do not match the authorized user in the storage system 14.

Figure 2:
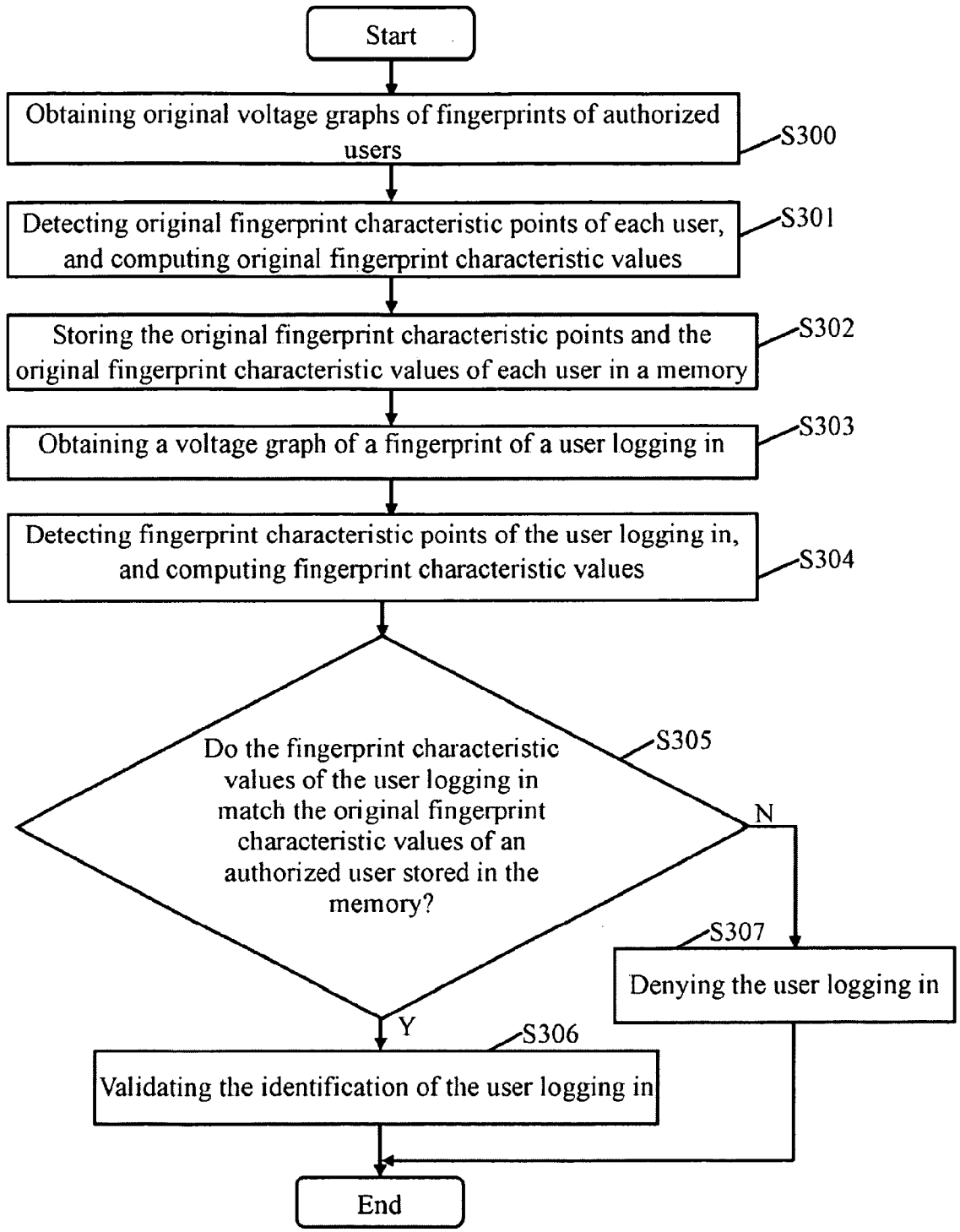
FIG. 2 is a flowchart of one embodiment of a method for controlling access to an electronic device by validating fingerprints in accordance with one exemplary embodiment.

FIG. 2 is a flowchart of a fingerprint identification method of the electronic device 1 in accordance with the exemplary embodiment.

In block S300, the obtaining module 100 obtains original voltage graphs of fingerprints of authorized users of the electronic device. The original voltage graphs may be determined and obtained when entering information of a new authorized user of the electronic device 1.

In block S301, the detecting module 101 detects original fingerprint characteristic points in the original voltage graphs of the original fingerprint image, and computes original fingerprint characteristic values according to the original fingerprint characteristic points.

In block S302, the storing module 102 stores the original fingerprint characteristic points and the original fingerprint characteristic values into the storage system 14.

In block S303, the obtaining module 100 obtains a voltage graph of a fingerprint of a user logging into the electronic device 1 in response to receiving a pressed signal from the touch panel 12 after the user logging in presses the touch panel 12 using one or more fingers.

In block S304, the detecting module 101 detects fingerprint characteristic points in the voltage graph of the fingerprint of the user logging in, and computes fingerprint characteristic values according to the detected fingerprint characteristic points.

In block S305, the determining module 103 determines if the computed fingerprint characteristic values match the original fingerprint characteristic values of an authorized user detailed in the storage system 14.

In block S306, if the computed fingerprint characteristic values match the original fingerprint characteristic values of the authorized user in the storage system 14, the validating module 104 validates the identification of the user logging in, and the procedure ends.

If the fingerprint characteristic values do not match the original fingerprint characteristic values of the authorized user in the storage system 14 in block S305, in block S307, the validating module 104 denies the user logging in access of the electronic device 1, and the procedure ends.

It should be emphasized that the above-described embodiments of the exemplary embodiments are merely possible examples of implementations, merely set forth for a clear understanding of the principles of the invention. Many variations and modifications may be made to the above-described exemplary embodiment without departing substantially from the spirit and principles of the invention. All such modifications and variations are intended to be included herein within the scope of this disclosure and the above-described exemplary embodiment and protected by the following claims.

What is claimed is:

1. A fingerprint identification system of an electronic device having a touch panel, the system comprising:
  a non-transitory computer readable medium that stores original fingerprint characteristic values of authorized users of the electronic device;
  an obtaining module configured for receiving pressed signals from the touch panel, and obtaining a voltage graph of a fingerprint of a user logging into the electronic device from the pressed signals;
  a detecting module configured for detecting fingerprint characteristic points in the voltage graph of the fingerprint, and computing fingerprint characteristic values according to the detected fingerprint characteristic points;
  a determining module configured for determining if the computed fingerprint characteristic values match the original fingerprint characteristic values of an authorized user in the non-transitory computer readable medium; and
  a validating module configured for validating an identification of the user logging in if the fingerprint characteristic values match the original fingerprint characteristic values of the authorized user in the non-transitory computer readable medium wherein the original fingerprint characteristic values and the fingerprint characteristic values comprise a characteristic point count, characteristic point coordinates, a linked shape of the characteristic points, and relative positions between adjacent characteristic points.

2. The system according to claim 1, wherein:
  the obtaining module is further configured for obtaining original voltage graphs of fingerprints of the authorized users in response to receiving pressed signals from the touch panel;
  the detecting module is further configured for detecting original fingerprint characteristic points in the original voltage graphs of the fingerprints, and computing original fingerprint characteristic values according to the original fingerprint characteristic points.

3. The system according to claim 2, further comprising a storing module configured for storing the original fingerprint characteristic points and the original fingerprint characteristic values into the non-transitory computer readable medium.

4. The system according to claim 1, wherein the fingerprint characteristic points comprises main characteristic points and sub-characteristic points in the voltage graph of the fingerprint.

5. The system according to claim 4, wherein the main characteristic points comprises a whorl and a triradius in the voltage graph of the fingerprint, and the sub-characteristic points comprises broken fingerprint ridges and bifurcating fingerprint ridges in the voltage graph of the fingerprint.

6. A fingerprint identification method of an electronic device, the electronic device having a touch panel and a non-transitory computer readable medium, the method comprising:
: storing original fingerprint characteristic values of authorized users of the electronic device in the non-transitory computer readable medium;
: receiving pressed signals from the touch panel, and obtaining a voltage graph of a fingerprint of a user logging into the electronic device from the pressed signals;
: detecting fingerprint characteristic points in the voltage graph of the fingerprint, and computing fingerprint characteristic values according to the detected fingerprint characteristic points;
: determining if the computed fingerprint characteristic values match the original fingerprint characteristic values of an authorized user in the non-transitory computer readable medium; and
: validating an identification of the user logging in if the fingerprint characteristic values match the original fingerprint characteristic values of the authorized user in the non-transitory computer readable medium wherein the original fingerprint characteristic values and the fingerprint characteristic values comprise a characteristic point count, characteristic point coordinates, a linked shape of the characteristic points, and relative positions between adjacent characteristic points.

7. The method according to claim 6, wherein the storing block comprises:
: receiving pressed signals from the touch panel, and obtaining a voltage graph of an authorized user from the pressed signals of the authorized user logging in the electronic device;
: detecting the original fingerprint characteristic points of the authorized user in the original voltage graph of the fingerprint, and computing the original fingerprint characteristic values of the authorized user according to the original fingerprint characteristic points; and
: storing the original fingerprint characteristic points and the original fingerprint characteristic values of the authorized user into the non-transitory computer readable medium.

8. The method according to claim 6, wherein the fingerprint characteristic points comprise main characteristic points and sub-characteristic points in the voltage graph of the fingerprint.

9. A storage medium having stored thereon instructions that, when executed by an electronic device, cause the electronic device to perform a fingerprint identification method of the electronic device, the method comprising:
: storing original fingerprint characteristic values of authorized users of the electronic device in the non-transitory computer readable medium;
: receiving pressed signals from the touch panel, and obtaining a voltage graph of a fingerprint of a user logging into the electronic device from the pressed signals;
: detecting fingerprint characteristic points in the voltage graph of the fingerprint, and computing fingerprint characteristic values according to the detected fingerprint characteristic points;
: determining if the computed fingerprint characteristic values match the original fingerprint characteristic values of an authorized user in the non-transitory computer readable medium; and
: validating an identification of the user logging in if the fingerprint characteristic values match the original fingerprint characteristic values of the authorized user in the non-transitory computer readable medium.

10. The non-transitory computer readable medium as claimed in claim 9, wherein the fingerprint characteristic points comprise main characteristic points and sub-characteristic points in the voltage graphs of the fingerprint.

11. The non-transitory computer readable medium as claimed in claim 9, wherein the storing block comprises:
: receiving pressed signals from the touch panel, and obtaining a voltage graph of an authorized user from the pressed signals of the authorized user logging in the electronic device;
: detecting the original fingerprint characteristic points of the authorized user in the original voltage graph of the fingerprint, and computing the original fingerprint characteristic values of the authorized user according to the original fingerprint characteristic points; and
: storing the original fingerprint characteristic points and the original fingerprint characteristic values of the authorized user into the non-transitory computer readable medium.

\* \* \* \* \*